Feb. 25, 1969      O. W. SEPP      3,429,532

PARACHUTE SKIRT EXPANDER

Filed April 3, 1967      Sheet 1 of 2

INVENTOR.
OSCAR W. SEPP

Feb. 25, 1969　　　O. W. SEPP　　　3,429,532
PARACHUTE SKIRT EXPANDER
Filed April 3, 1967
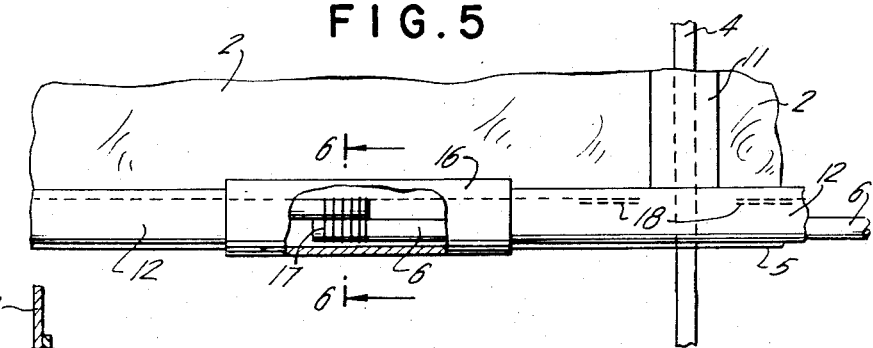
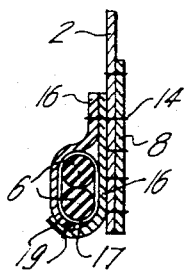
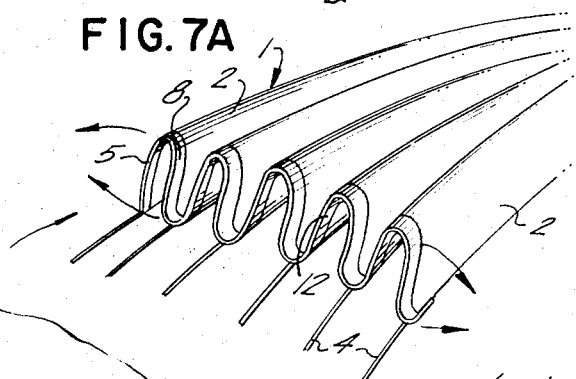
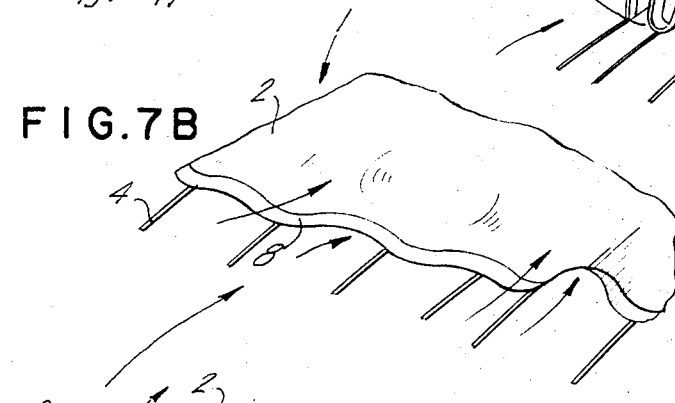
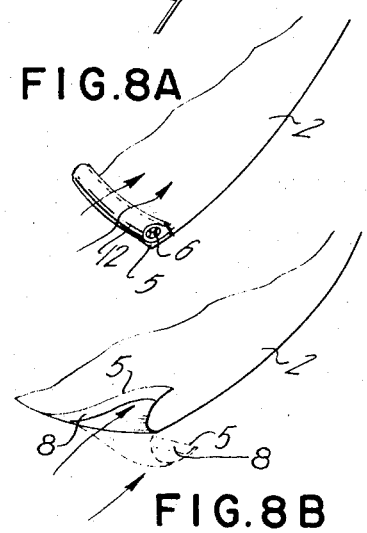
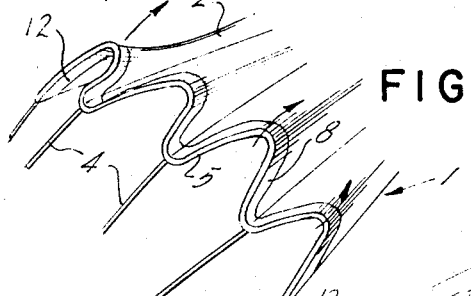
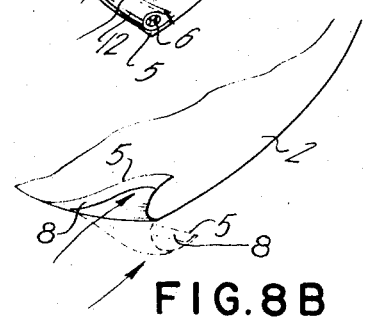
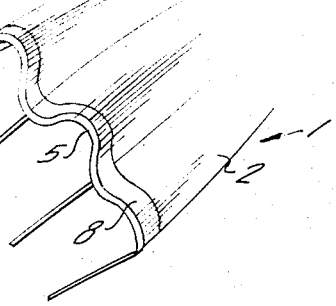
INVENTOR.
OSCAR W. SEPP 3,429,532
Patented Feb. 25, 1969

3,429,532
PARACHUTE SKIRT EXPANDER
Oscar W. Sepp, Merrick, N.Y., assignor to M. Steinthal & Co., Inc., New York, N.Y., a corporation of New York
Filed Apr. 3, 1967, Ser. No. 628,089
U.S. Cl. 244—149   10 Claims
Int. Cl. B64d *17/52, 17/14*

ABSTRACT OF THE DISCLOSURE

A flexible and resilient rod affixed around the skirt portion of a parachute. The rod material is such as will provide a definite leading edge to form a positive orifice to air flow at low speeds and will bend in the direction of air flow at medium and high speeds.

---

Parachute skirt expander

This invention relates to parachutes and more particularly to a means to provide rapid and reliable opening, particularly at low speeds.

The speed at which a parachute opens so as to support its load is directly related to the speed at which it is moving when the parachute is released. The higher the speed, the greater the effective force of the air through which th parachute is propelled and the more rapidly the parachute opens. Conversely, at low speeds and low altitudes, when the need for the parachute may be great, its usefulness may be at a minimum because it may not open in time to support its load.

For parachutes which are used in ejection seat systems, an extreme condition occurs when the aircraft is on the ground and at zero-zero speed. Here, the sole force to open the parachute is provided by the upwards ejection thrust of the system.

Accordingly, great purpose will be served by a means for rapidly and reliably opening a parachute at low speeds.

At high speeds, however, the problem tends to reverse itself. Under high speed conditions, the danger present is that the large effective force of the air will produce opening shocks that may destroy the parachute. Hence, the means we seek for increasing the rate of opening at low speeds must not contribute its effects at high speeds as well, or else we risk increasing the opening shocks to dangerous levels. The means should be speed sensitive and enable normal opening at medium and high speeds.

Accordingly, an object of this invention is a parachute opener which provides rapid and reliable opening of parachutes at low speeds without affecting normal openings at medium and high speeds.

Another object of this invention is to provide a means for rapidly opening a parachute at low speeds with repeatedly high reliability, and over a wide temperature range.

An object of this invention is to provide a means for rapidly opening a parachute at low speeds which is easily incorporated into a parachute and does not require special packing skills.

An object of this invention is to provide a means for rapidly and reliably opening a parachute at low speeds without increasing opening shocks.

An object of this invention is to provide a means for rapidly and reliably opening an ejection seat parachute at zero speed conditions.

These objectives are accomplished in the present invention by a parachute skirt expander comprising a resilient and flexible rod of special composition which is held within a fabric conduit around and with the skirt of a parachute canopy. At low speeds, when the parachute enters the free air, the parachute opener presents a definite and determined leading edge to provide a positive orifice to the air through which it moves. Due to the composition of the rod material, its inherent bend characteristics, and its construction within the parachute, at high speeds, the leading edge is intended to be pushed by the force of the air, thus overcoming the positive orifice.

In effect, therefore, the parachute skirt expander is speed sensitive and contributes nothing to the opening shocks experienced at high speeds.

These objects and features of this invention will be more fully understood from the following detailed description taken in connection with the drawings in which:

FIGURE 5 is an enlarged view of a portion of the parachute canopy in FIGURE 1 at the place where the flexible rod is spliced with a portion of connector sleeve removed to show the flexible rod.

FIGURE 6 is a sectional view taken through section line 6—6 in FIGURE 5.

FIGURE 7A is a schematic view of a portion of canopy skirt which incorporates the invention.

FIGURE 7B is a schematic view of a portion of a canopy skirt without the invention.

FIGURE 8A is a second schematic view of a smaller portion of a canopy skirt which incorporates the invention.

FIGURE 8B is a second schematic view of a smaller portion of a canopy skirt without the invention.

FIGURE 9A is a schematic view of a portion of a canopy skirt which incorporates the invention at high speed.

FIGURE 9B is a schematic view of a portion of a canopy skirt which incorporates the invention at low speed.

Figure 1:
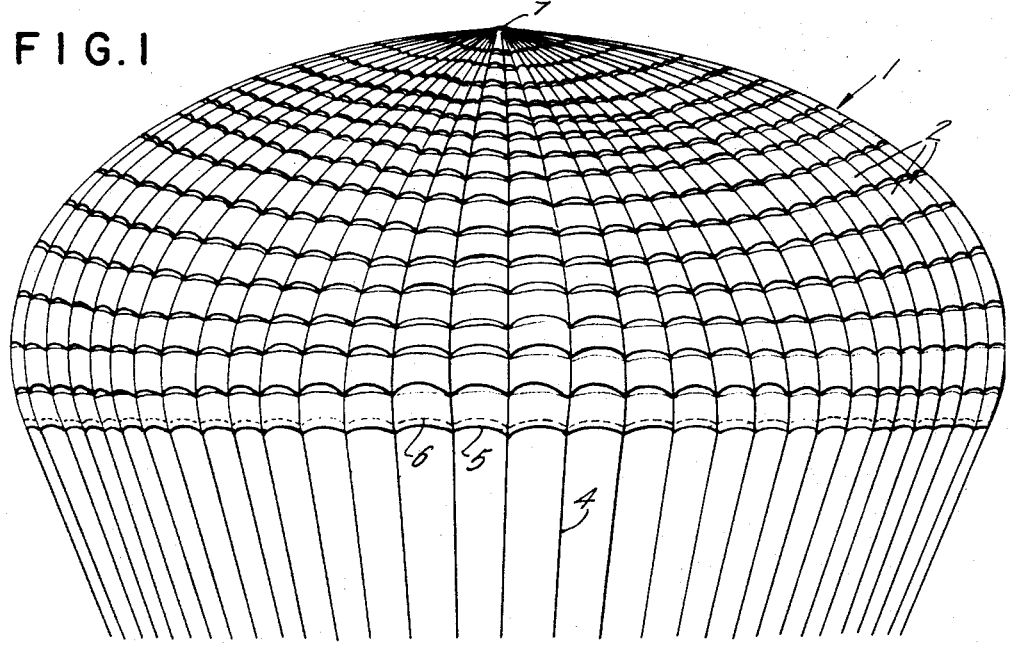
FIGURE 1 is a side view of a ring sail parachute canopy which incorporates the invention.

Referring now to the drawings, FIGURE 1 shows the canopy, shown generally as 1, and a portion of the suspension lines 4 of a ring sail parachute. Gore panels 2 are stitched together in a radial array which converges at the vent portion 7 of the canopy. The suspension lines 4 join the canopy 1 at the canopy skirt 5. Affixed within the canopy at the skirt 5 is a flexible rod 6, the details and performance of which will be more fully described hereinafter. For purposes of describing an embodiment of the invention, a ring sail parachute has been chosed. It should be clearly understood however, that the present invention will perform equally well with any other type of parachute canopy to which the rod 6 can be affixed, such as a flat circular canopy, a hemispherical canopy, or a sky sail canopy.

Figures 3, 4:
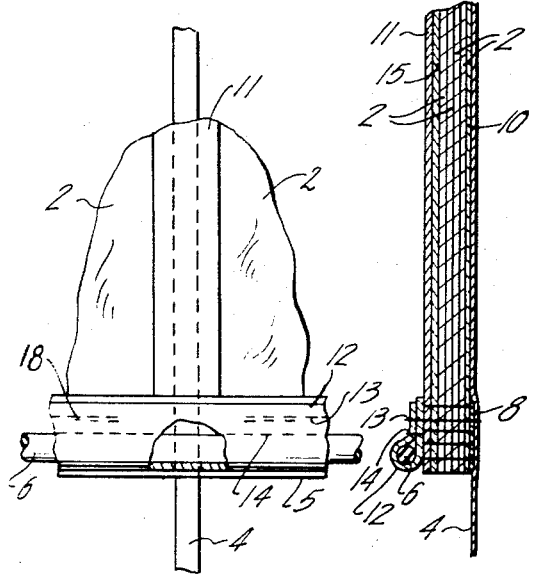
FIGURE 3 is a view of the portion shown in FIGURE 2 as seen from within the parachute canopy with a portion of tape conduit removed to show a flexible rod.
FIGURE 4 is a sectional view taken through section lines 4—4 in FIGURE 2.
Figure 2:
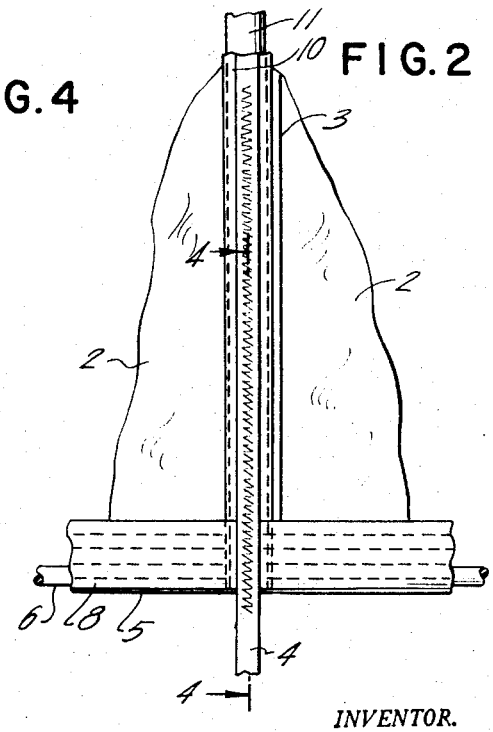
FIGURE 2 is an enlarged view of a portion of the parachute canopy in FIGURE 1 at junction of a suspension line and the canopy skirt.

In FIGURES 2, 3 and 4, the junction of the suspension lines 4 and the canopy skirt 5 are shown in detail. Adjacent edges of fabric gore panels 2 are folded back, as at fold line 3 overlapped and interleaved to form 4 plies. An outer radial tape 10 and an inner radial tape 11 and a suspension line reinforcement 15 sandwich the interleaved plies of gore panels 2. Surrounding the canopy at the skirt 5 is a skirt band 8 of fabric. The suspension line 4 is stitched over the skirt band 8 and extends a distance up the radial seam. A similar construction is provided at each junction of the suspension lines 4 and the parachute skirt 5, except at the single position of the reefing line cutter (not shown). The reefing line arrangement and the method of attaching the reefing rings at the canopy skirt 5 do not form part of this invention and have been omitted in the interest of presenting a clear description.

Affixed within the canopy at the skirt 5 is a fabric conduit 12 of thin nylon tape which is aligned opposite the skirt band 8 and extends substantially around and within the entire canopy skirt 5 adjacent the outer peripheral limits of the canopy, except as will be described with reference to FIGURE 5. A flexible and resilient rod 6 is fitted within the conduit 12 and likewise extends around and within the entire canopy skirt 5. The rod 6 is a solid cylindrical silicone rubber rod approximately 3/16 to 5/16 inch in diameter. It has been found in actual tests that a rod of this composition performs equally successfully with various canopy types and over a wide range of canopy sizes, including 1 foot, 24 foot, 28 foot and 70 foot diameter canopies and over a wide range of operating temperatures from below —65° F. to above 150° F.

The rod 6 and the fabric conduit 12 may be assembled separately, the fabric tape material of conduit 12 being wrapped about the rod 6 and joined to itself by a single line of stitching 14. Then the conduit 12 is laid within the skirt 5 and joined to it by another single line of stitching 13. Stitching 13 is discontinued in the area of the junction of the suspension line 4 and the skirt 5 and reinforced at that point with back stitching 18 on both sides of the junction.

Referring to FIGURES 5 and 6, conduit 12 and rod 6 extend around and within the entire skirt 5. The rod 6 extends beyond the conduit 12 at both ends and is overlapped upon itself and spliced with cord thread 17 such as No. 5 cord thread. A sleeve 16 is fabricated of two nylon tapes joined together by stitching 19, wrapped about the the spliced rod 6 and joined to the gore panel 2 and skirt band 8 by a single line of stitching 13.

The operation of the skirt expander will now be described. In FIGURE 7A, a skirt portion 5 of a parachute canopy 1 is seen as it emerges into the air. The canopy 1 is packed within its deployment bag (not shown) with the skirt portion 5 folded back and forth. No special skill is required to effect this folding and packing. Upon emerging into the air, the rod within the conduit 12 tends to forcibly unbend at the bend or fold locations to a natural position and urges the skirt 5 of the canopy 1 into an orifice, as shown by the directional arrows. In addition, and of equal importance, the rod 6 in the conduit 12 creates a positive orifice by providing a definite and determined leading edge to the air flow, as shown in FIGURE 8A. By contrast, the skirt characteristics of a canopy without the skirt expander is shown in FIGURE 7B.

An ordinary parachute 1, without the skirt expander has a soft skirt band 8 with indefinite leading edge characteristics. As a result, the orifice is not positive and is not fully used. As shown in FIGURE 8B, the leading edge may tend in fact to hinder opening of the parachute by tending to fold into the mouth of the canopy.

Another important aspect of the present invention is shown with reference to FIGURES 9A and 9B. It has been found that a skirt expander comprised of the material and constructed in the manner as hereinbefore described displays important speed sensitive characteristics. FIGURE 9B shows a parachute canopy 1 that includes a skirt expander under low speed conditions. A low speeds, that is, from 0 to about 130 knots, the skirt 5 expands into an open condition. The rod 6 within the conduit 12 presents a definite and determined leading edge to the onrushing air which is captured within the positive orifice of the canopy and which exerts its fullest force to open the canopy at a very rapid rate. It has been found that at low speed, parachute opening speed is increased 40% to 50% and parachutes open reliably each time.

Under high speed conditions, the force of the onrushing air is sufficiently great to rapidly open the parachute so that no additional opening aid is necessary. In fact, the additional opening forces created by such an aid could contribute to harmful opening shocks which, under extreme conditions could destroy the parachute.

It has been found that the skirt expander having the bend characteristics of the materials and constructed as described herein, will, under high speed conditions, act as shown in FIGURE 9A. At high speed, the leading edge of the skirt 5 of the canopy 1 is pushed by the force of the air acting against it. By intent, the rod 6 in conduit 12 will bend in the direction of air flow overcoming the positive orifice and effectively neutralizing the skirt expander. It has has been found that at high speeds, the skirt expander does not increase parachute opening speed and has in fact been observed to retard it in some tests.

What is claimed is:

1. A parachute comprising a canopy having a plurality of gores radially arranged towards a skirt portion, a plurality of suspension lines arranged about said skirt portion and joining therewith and a flexible, resilient element extending around and affixed to said skirt portion close to the leading edge of said canopy adjacent the outer peripheral limits, said element comprising narrow rod means of flexible material packable in a plurality of folds and expandable from said folds to provide a dynamic pressure sensitive leading edge adapted to form positive orifices to airflow at the leading edge of said canopy at low speeds and a bend in the direction of air flow to overcome said orifices at higher speeds.

2. A parachute in accordance with claim 1 in which said flexible resilient element comprises a silicone rubber rod.

3. A parachute in accordance with claim 2 in which said rubber rod is a solid cylinder and approximately 3/16 to 5/16 inch in diameter.

4. A parachute in accordance with claim 1 in which said resilient element is positioned around the inner surface of said skirt within a fabric conduit and extends at its ends beyond said conduit and is spliced at said extended ends and a fabric sleeve covers said extended ends including the spliced portion.

5. A parachute in accordance with claim 4 in which said extended ends are overlapped and are spliced by a cord thread.

6. A parachute comprising a canopy having a skirt portion and a plurality of suspension lines radially arranged about said canopy and attached thereto, said canopy comprising a plurality of gores overlapped at a plurality of radially arrayed seams, a plurality of radial tapes affixed upon said seams, said suspension lines being affixed upon said radial tapes, a skirt band surrounding said canopy at said skirt portion, a fabric conduit affixed around and within the mouth of the canopy and directly behind said skirt band and a flexible resilient rod within said conduit extending around and within said skirt portion, said conduit being attached to said skirt portion by stitching.

7. A canopy in accordance with claim 6 in which said rod comprises a narrow rod packable in a plurality of folds and expandable from said folds to provide a dynamic pressure sensitive leading edge adapted to form positive orifices to air flow at the leading edge of said canopy at low speeds and to bend in the direction of air flow to overcome said orifices at higher speeds.

8. A canopy in accordance with claim 7 in which said stitching is discontinued in the areas of said radial seams and is reinforced at said discontinuations.

9. A canopy in accordance with claim 7 in which said conduit comprises a nylon fabric tape extending longitudinally within said canopy skirt and wrapped around said rod.

10. A canopy in accordance with claim 7 in which said rod comprises solid silicone rubber.

(References on following page)

References Cited

UNITED STATES PATENTS

| | | | |
|---|---|---|---|
| 2,505,954 | 5/1950 | Frieder et al. | 244—149 X |
| 3,127,137 | 3/1964 | Downing | 244—145 |
| 3,152,782 | 10/1964 | Karpf | 244—145 |

OTHER REFERENCES

The Bulletin of the Dow Corning Center for aid to medical research, July 1961, page 12, column 1, paragraph 4, and column 2, paragraph 2.

The Plastics Manual, 1966, page 67.

MILTON BUCHLER, *Primary Examiner.*

RICHARD A. DORNON, *Assistant Examiner.*

U.S. Cl. X.R.

244—145